(12) United States Patent
Brodfuehrer et al.

(10) Patent No.: US 8,185,512 B2
(45) Date of Patent: May 22, 2012

(54) PRIORITIZATION OF SEARCH REQUESTS USING SEARCH TEMPLATES

(75) Inventors: Richard Joseph Brodfuehrer, Endicott, NY (US); John Michael Walsh, Endwell, NY (US); Kim J. Worm, Red Hook, NY (US); Barbara Ann Marie Maslak, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 12/328,398

(22) Filed: Dec. 4, 2008

(65) Prior Publication Data
US 2010/0145977 A1 Jun. 10, 2010

(51) Int. Cl.
*G06F 17/30* (2006.01)
(52) U.S. Cl. ....................................................... 707/706
(58) Field of Classification Search ................... 707/706
See application file for complete search history.

(56) References Cited

U.S. PATENT DOCUMENTS

| | | | |
|---|---|---|---|
| 5,623,652 A * | 4/1997 | Vora et al. ...................... | 707/742 |
| 5,715,443 A * | 2/1998 | Yanagihara et al. ................ | 1/1 |
| 5,819,273 A * | 10/1998 | Vora et al. ............................ | 1/1 |
| 5,991,756 A * | 11/1999 | Wu ................................ | 707/706 |
| 6,161,102 A * | 12/2000 | Yanagihara et al. ................ | 1/1 |
| 6,785,671 B1 * | 8/2004 | Bailey et al. ............... | 705/26.81 |
| 7,716,235 B2 * | 5/2010 | Davallou ........................ | 707/766 |
| 7,827,170 B1 * | 11/2010 | Horling et al. ................ | 707/722 |
| 7,899,814 B2 * | 3/2011 | Tanaka et al. ................. | 707/724 |
| 7,970,750 B2 * | 6/2011 | Goel et al. .................... | 707/706 |
| 7,984,062 B2 * | 7/2011 | Dunning et al. ............. | 707/766 |
| 2005/0131876 A1 * | 6/2005 | Ahuja et al. ....................... | 707/3 |
| 2005/0216444 A1 * | 9/2005 | Ritter et al. ....................... | 707/3 |
| 2005/0267945 A1 * | 12/2005 | Cohen et al. .................. | 709/215 |
| 2008/0208804 A1 | 8/2008 | Lin | |
| 2009/0024621 A1 * | 1/2009 | Burgess et al. .................... | 707/6 |
| 2009/0055829 A1 * | 2/2009 | Gibson .......................... | 718/103 |
| 2009/0077055 A1 * | 3/2009 | Dillon et al. ..................... | 707/5 |

OTHER PUBLICATIONS

Wahl, et al., Lightweight Directory Access Protocol (v3), The Internet Society, Dec. 1997, pp. 1-57.
Vaupel, Robert, "z/OS Workload Manager, How it works and How to Use it", Apr. 2004, pp. 1-28.

* cited by examiner

*Primary Examiner* — John R. Cottingham
*Assistant Examiner* — Noosha Arjomandi
(74) *Attorney, Agent, or Firm* — Karuna Ojanen; Ojanen Law Offices (57) ABSTRACT

A method, a computer system, and a computer program product that prioritizes search requests to a database directory by assigning the search requests to one or more templates. Attributes of the search requests, such as an IP address, the portion of the database to which the search is constrained, one or more return attributes, the scope of the search, and/or search filters used, are compared with values of those attributes of the templates. The template whose values of the attributes match the values of the attributes in the search request is selected. This template has a template identifier that is associated with a transaction name of a work unit enclave. The search request is then associated with the work unit enclave and the operating system of the computer system will execute the search request in accordance with the performance goals and priority of the service class into which the work unit enclave is assigned. Process steps include creating a search template if none exist, and configuring a database server to assign a transaction name to search requests based on attributes and their values of the search request and then associating that transaction name with a transaction name of the work unit enclave.

19 Claims, 5 Drawing Sheets

PRIORITIZATION OF SEARCH REQUESTS USING SEARCH TEMPLATES

FIELD

This invention relates to the analysis of search requests to a database stored in computer memory and more particularly relates to a machine, a computerized method and a computer program product that prioritizes the execution of search requests to a database based on search templates having the values of the attributes of the search request.

BACKGROUND

Information is a predominant aspect feature of the modern world; significant resources are dedicated to obtaining it; organizing it; storing it; accessing it, etc. Indeed, much of the world's computing power is dedicated to maintaining and efficiently using information, typically stored in databases. A database is a logical collection of data, in the form of text, numbers, or encoded graphics, organized for storage as a unit, typically in a computer. Databases are commonly organized into tables that are simple row and column arrangements of related data that characterize persons, products companies, electronic mail, contact information, financial data, records of sales, performance data of processing units—anything about which data is collected. In a typical database, the rows of a table represent records, or collections of information about separate items. Each horizontal record contains one or more fields, representing individual data elements. Each vertical column of the table represents one field that is stored for each row in the table. The database records may contain any type of data and that data can be searched, accessed and modified by the user. Businesses and other organizations use databases to manage information about clients, orders, client accounts, etc.

Realizing the importance of meaningful storage of data, in 1970 Dr. E. F. Codd developed the relational model of databases based on how users perceive data and a mathematical theory of relations. The relational model represents data as two-dimensional logical entities in which each logical entity represents some real-world person, place, thing, or event about which information is collected. A relational database is a set of tables derived from logical entities and manipulated in accordance with the relational model of data. The relational database uses objects to store, manage, and access data; the basic objects in the database are tables, columns, views, indexes, constraints (relationships), and triggers. Articles by Dr. E. F. Codd throughout the 1970s and 80s such as Twelve Rules for Relational Databases and Is Your DBMS Really Relational? published in COMPUTERWORLD on Oct. 14, 1985 and Does Your DBMS Run By the Rules? published in COMPUTERWORLD on Oct. 11, 1985 are still referenced for implementation of relational databases. The twelve rules now number 333 rules and are published in The Relational Model for Database Management, Version 1 (Addison-Wesley, 1990).

A relational database stores information in tables as rows and columns of related data, and allows searches by using data in specified columns of one table to find additional data in another table. In searches of a relational database, a database server matches information from a field in one table with information in a corresponding field of another table and combines them to generate a third table that contains the requested data from the two tables. As an example of a relational database, if one database table contains the fields name, serial, address, phone and another table contains the fields serial, salary, and bonus, a relational database can match the serial fields in the two database tables to find such information as the names, and bonus of all people whose salary is above or below a certain amount. Thus, a relational database matches values in two and more tables to relate information in one table to information in another table. Computer databases are typically relational databases.

In today's world, databases systems are collections of files stored on computers that may or may not be linked to other collections or data in the same system or other linked systems such as the Internet. One or more large databases are stored on one or more servers. Users or applications called clients that may be located on that or a different server issue requests to a database server for data in the database. These requests are called search requests. A directory is one kind of database that is a set of objects with similar attributes organized in a logical and usually hierarchical arrangement. The most common example is the telephone directory having a series of names of either persons or organizations organized alphabetically, either by the name or by the services provided, with each name having an address and phone number attached. Another common example is the directory of files in a computer. For instance the main hard drive is usually given a label C:// and applications or data stored on that hard drive may given the pathway C://Music/ or C://Programs, etc. The Lightweight Directory Access Protocol (LDAP) is an application protocol for querying and modifying directory services on TCP/IP, a particular transmission and internet protocol. A LDAP directory tree often reflects various political, geographic, and/or organization boundaries in a database but usually uses the Doman Name System (DNS) names for the uppermost levels of the hierarchy. The DNS is a hierarchical naming system for computers, services, or any resource participating in the Internet that associates various data with domain names assigned to such participants. Most importantly, it translates human meaningful domain names, such as www.example.com, to the numerical (binary) identifiers, such as the IP address 208.77.188.166, associated with networking equipment for the purpose of locating and addressing these devices worldwide.

Indeed, the World Wide Web (www) is essentially a large database comprised of an expansive network of interconnected computers upon which businesses, governments, groups, and individuals throughout the world maintain interlinked computer files known as web pages. The volume of data available on the Internet is increasing daily but the ability of users to access, understand and transform data available on the Web, let alone their own data, has not kept pace. People now have the ability to access, capture, use, manipulate and integrate data available on the Internet from multiple sources for such applications as data mining, data warehousing, global information systems, and electronic commerce. At least two problems occur now with access to so much data. One problem is that a search request to one or more databases can return so much data that the useful data may be hidden in hundred of thousands of items returned. Anyone just has to do a Google search on a common word or phrase to understand the phenomenon. A different but related problem is that there are so many requests for data to a database that the searching software can't handle it efficiently. Access to search for data on directories and/or databases may be needed on a 24/7 basis and millions of search requests can occur in a small period of time. Some of the search requests to a database may be repetitive; others may be intended to lock-up or thwart a computer system; some search requests may accidentally lock the system in an endless processing loop because of a software bug so that other search requests are not given access to the database. Another scenario is that some search requests must be given higher priority at all or at specified times.

Spamming is the abuse of electronic messaging systems to indiscriminately send unsolicited bulk messages. Spamming clients can consume all of the database server resources and possibly all of the system resources. These clients are not necessarily malicious and might simply be run away or faulty applications controlled by an administrator. Currently, there is no easy way to identify and deal with spamming client transactions until it has already happened. It is not always preferable to simply block the spam because the client is not necessarily malicious and important transactions might be inadvertently blocked. Software processes that manage the database may permit classification of requests to different enclaves and assign different priorities to these enclaves but such management still does not identify spamming search requests. Administrators of the databases have to anticipate possible spamming clients and direct a search request from a possible spamming client to a separate work group or enclave. This is unrealistic because spam cannot be determined until it has already happened. Isolating possible spamming clients in advance, moreover, would require many enclaves to be created, some of which end up being unnecessary or repetitive. Another problem with this approach is that arbitrary or global values in the search requests require the administrator to create an enclave for several searches that for all intents and purposes are equivalent. This could require the administrator to create a large number of enclaves and still not be fully covered. It might also be unrealistic or impossible for an administrator to predict what kind of spam they will receive.

One option is to give low priority to clients identified as spamming users. Other options are that an administrator may want to alter the priority of clients that are important or search transactions that take a long time to run; giving these clients and tasks a higher priority. Administrators can group together similar workloads into a smaller and more manageable set of search requests and prioritize these search requests to fit their individual needs. Storing an entry in the database server for each search request is unrealistic because of the space the list would consume would be massive and the list would be unmanageable.

What are needed in the realm of database searches is a method, a machine, and a computer program product to enable a database server to identify search requests as being possibly problematic and then treat these requests differently. Also what is needed is a method and a machine to identify those search requests that should be given higher priority because of the client or the nature of the task. Thus, what is required is a dynamic and automated machine, method, and computer program product that interrogates a search request, determines if the nature of the search request is spam, and if so then classifies and prioritizes the search request in accordance with its attributes and statistics. These needs and others that will become apparent are solved by the invention as stated below:

SUMMARY OF THE INVENTION

Thus what is disclosed herein is a method, a machine, and a computer program product having program instructions to execute searches of a database directory, the method comprises the steps of receiving a search request having a plurality of attributes and then prioritizing execution of the search request using values of one or more of the plurality of attributes.

The method has process steps and the computer program product, when installed in a computer memory, causes a computer processor to execute program instructions to read a value of at least one attribute of a search request, determine that the value of the at least one attribute matches a value of at least one attribute in a search template, create a new search template when the value of the at least one attribute does not match the value of at least one attribute in a search template, select the search template having values and attributes that closest match values and attributes of the search request, determine that the selected search template is associated with a service class having an execution priority, and schedule execution of the search request according to the execution priority of the associated service class. The method further comprises assigning an identifier to the search template and associating the template identifier with the transaction name of a work unit. If there is no template identifier, the method and the computer program instructions can associate a transaction name of the work unit using one or more attributes of the search request, such as the IP address of the source and a requestor's logon ID.

Attributes and their values of the search request that are read and may be used for selection of a search template include an IP address of the source of the search request, a requestor's logon ID, the portion of the database to which the search request is confined, scope of the search, one or more return attributes to be returned to the source when the search request has been executed, and/or one or more search filters of the search request.

The method above presupposes that within the workload manager of the operating system, a work unit (enclave) of at least one task to be executed in the computer has been created; and characteristics have been assigned to the work unit which comprise a transaction name, an instance of a database server, and a processor complex; and that the work unit has been designated to a service class having performance goals and/or priority designations.

A computer system that prioritizes search requests to a database stored on the computer system, comprises: at least one processor having an operating system, the operating system having a workload manager and the processor identified by a processor id; at least one database accessed by the operating system; at least one database server managing access to the database by the operating system and its workload manager; the database server identified by a database server id. The database server further comprises a plurality of search templates stored in a memory, the search templates identified by a template id and characterized by values of one or more template attributes; a search formatter that receives requests to access the database and formats one or more attributes of each request, if necessary; a search comparator that compares values of the one or more request attributes with the values of one more template attributes; a template selector that selects the search template whose values of template attributes most match the values of the one or more request attributes; and an enclave selector that selects an enclave of the workload manager that most matches the template id of the selected search template; and a scheduler in the workload manager that schedules the request to access the database according to service class associated with the selected enclave.

These and other features of the embodiments are best understood when reading the Detailed Description of the Invention in conjunction with viewing the figures of the Drawing as described below.

DETAILED DESCRIPTION OF THE INVENTION

The invention is described with reference to the accompanying drawings; however, the invention may be embodied in many different forms and should not be construed as limited to the embodiments set forth herein. Rather the illustrated embodiments are provided so that this disclosure is thorough and complete, and fully conveys the scope of the invention to those skilled in the art. Like numbers refer to like elements throughout.

As will be appreciated by one of skill in the art, the present invention may be embodied as a method, a data processing system, and a computer program product to prioritize searches of a database directory based on a combination of search attributes. Accordingly, the present invention may take the form of an entirely hardware embodiment, an entirely software embodiment, or an embodiment combining software and hardware aspects. Furthermore, the present invention may take the form of a computer program product on a computer-usable storage medium having computer-usable program components embodied in the medium. Any suitable computer readable medium may be utilized including hard disks, CD-ROMs, optical storage devices, a transmission media such as those supporting the Internet or an intranet, or magnetic storage devices.

Computer program source code of the method by which to prioritize searches of a database directory based on attributes of the search template in accordance with a preferred mode described herein may be written in an object-oriented programming language such as C, Java, Smalltalk or C++. Object code of the identification and prioritization of attributes and ascribing the attributes to a known search template may execute entirely on an individual server or client, partly on an individual or a backup server or client, as a stand-alone software package, partly on the individual or backup server or client and partly on a remote server or client or entirely on the remote server or client. In the latter scenario, the remote server or client may be connected to the individual or backup server or client through a local area network (LAN) or a wide area network (WAN), or the connection may be made to the remote server or client via the Internet using an Internet Service Provider.

The machine, method, and computer program code by which to identify search attributes and then to prioritize the search based on the template associated with the attributes are described below with reference to flowchart illustrations and/or block diagrams of methods, apparatus (systems), components, and computer program products according to embodiments of the invention. It will be understood that each block of the flowchart illustrations and/or block diagrams, and combinations of blocks in the flowchart illustrations and/or block diagrams, can be implemented by computer program instructions with a computer. These computer program instructions may be provided as one or more components to a processor of a general purpose computer, special purpose computer, or other programmable data processing apparatus to produce a machine, such that the components, which execute via the processor of the computer or other programmable data processing apparatus, implement the functions/acts specified in the flowchart and/or block diagram block or blocks.

These computer program components for prioritizing searches of a database directory based on the search attributes may also be stored in a computer-readable memory that can direct a computer or other programmable data processing apparatus to function in a particular manner, such that the components stored in the computer-readable memory produce an article of manufacture including components which implement the functions/acts specified in the flowchart and/or block diagram block or blocks. The computer program components may be loaded onto a computer or other programmable data processing apparatus to cause a series of operational steps to be performed on the computer or other programmable apparatus to produce a computer implemented process such that the components which execute on the computer or other programmable apparatus provide steps for implementing the functions/acts specified in the flowchart and/or block diagram block or blocks.

Figure 1:
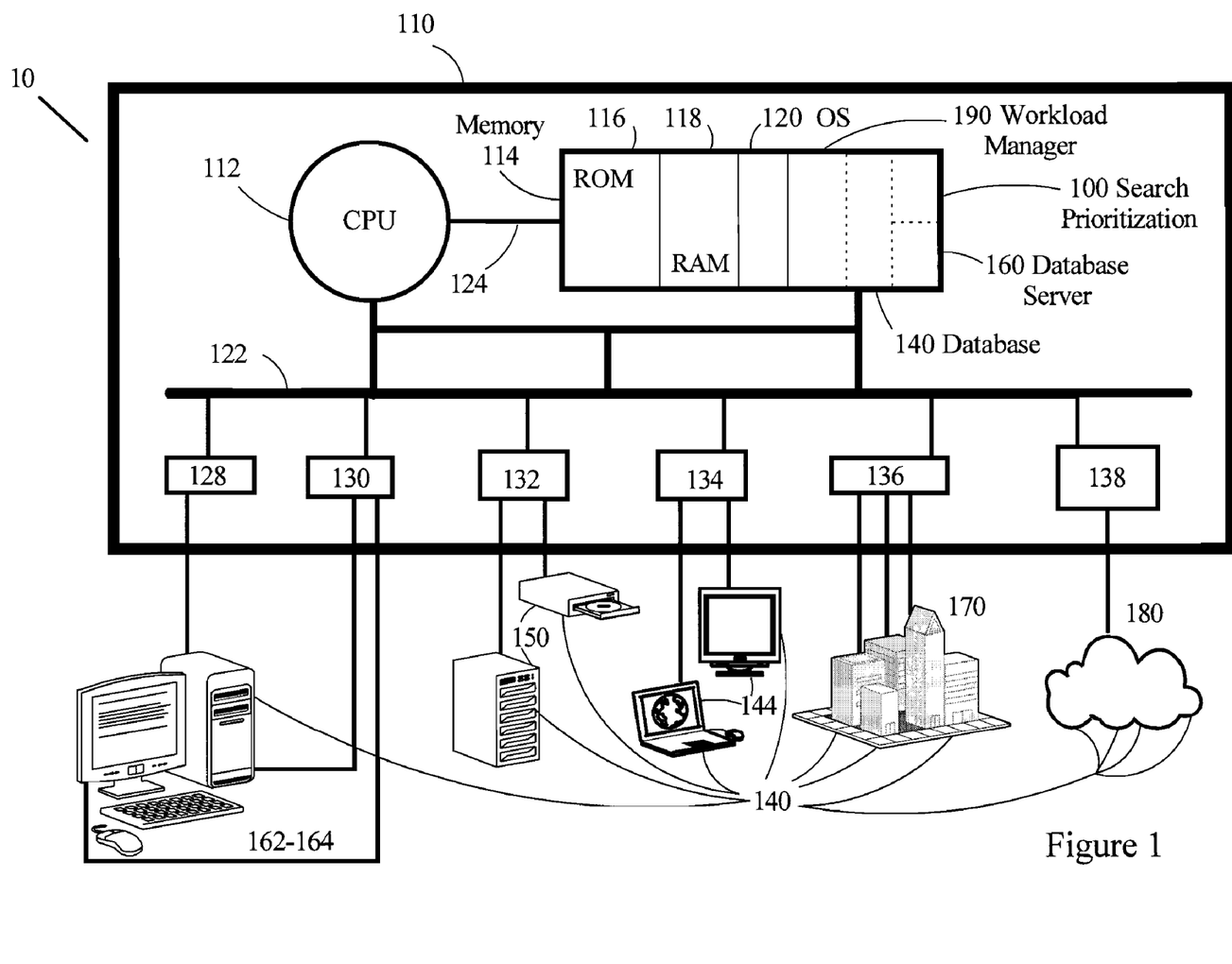
FIG. 1 is a simplified block diagram of a data processing network that can be used to prioritize search requests to a database as described herein.

Referring to FIG. 1, shown is a high-level block diagram of a computer network system 10 consistent with an embodiment of a system to prioritize access to a database directory based on the search attributes. Computer network system 10 preferably comprises a number of secure networked computers 110, each of which may have a central processing unit (CPU) 112, memory 114, and various digital and/or analog interfaces 128-138. CPU 112, memory 114 and other various devices communicate with each other via an internal communications bus arrangement 122. CPU 112 is a general-purpose programmable processor, executing instructions stored in memory 114; while a single CPU 112 is shown in FIG. 1, it should be understood that computer systems having multiple CPUs could be used. CPU 112 is capable of executing an operating system 120, and various applications 300. CPU 112 is also capable of generating the computer program components embodying the search prioritization methods described herein and is capable of receiving and transmitting the program instructions embodying the processes to prioritize search of a database directory. Communications bus 122 supports transfer of data, commands and other information between different devices and interfaces; and while shown in simplified form as a single bus, it is typically structured as multiple buses including an internal bus 124 which may connect the CPU 112 directly with memory 114.

Memory 114 is shown conceptually as a single monolithic entity but it is well known that memory is often arranged in a hierarchy of caches and other memory devices, some or all of which may be integrated into the same semiconductor substrate as the CPU 112. Memory 114 comprises a read only memory (ROM) 116 that typically stores those portions or programs, routines, modules of the operating system 120 necessary to "boot up" the system. Random-access memory (RAM) 118 devices comprise the main storage of computer, as well as any supplemental levels of memory, e.g., cache memories, nonvolatile or backup memories, programmable or flash memories, other read-only memories, etc. RAM 118 is also considered the volatile memory storing programs and data that are executing, as well as the operating system 120, a workload manager 190, one or more databases including their directories 140, one or more database servers 160, a search prioritization program 100, and other applications 300, data and programs such as graphical user interfaces, application program interfaces by which the search prioritization program 100 can interact with the database server 160. In addition, memory 114 may be considered to include memory storage physically located elsewhere in computer, e.g., a cache memory in a processor or other storage capacity used as a virtual memory, e.g., as stored on a mass storage device 150 or on another computer coupled to computer via network. It is fully realizable that the search prioritization program 100 can be used to search and prioritize search requests in databases 140 within any memory 114 including ROM and RAM located within and outside the computer processing device 110 upon which the search prioritization program 100 is installed and executing. As shown in FIG. 1, search prioritization program 100 may be connected to databases 140 stored on other devices across the network and may discover and search the directories of those databases 140 in accordance with the principles herein. Database 140 herein represents not only the actual database but also one or more other directory databases, search template databases, etc. that are used to access data in any of these databases.

Operating system 120 provides, inter alia, functions such as device interfaces, management of memory pages, management of multiple tasks, etc. as is known in the art. Examples of such operating systems may include Linux, Aix, Unix, Windows-based, Z/os, V/os, OS/400, an Rtos, a handheld operating system, etc. In one embodiment described herein, the operating system is z/OS for IBM'S zSeries computers and z/OS has a workload manager 190 that schedules the work through the operating system. The workload manager 190 is a large oversight program that, inter alia, introduces the capability of dynamically allocating or redistributing server resources across a set of workloads based on user-defined goals and the resource demands. The workload manager allows an end user to classify work running on an operating system in distinct service classes and defines goals for them which express the expectation how the work should perform. Operating systems 120 and other variants of the search prioritization program 100 and other applications 300, other components, programs, objects, modules, etc. may also execute on one or more processors in another computer coupled to computer 110 via a network 170, 180, e.g., in a distributed or client-server computing environment, whereby the processing required to implement the functions of a computer program may be allocated to multiple computers 110 over a network 170, 180.

In general, search prioritization program 100 executes within the CPU 112 to implement the embodiments of the invention, whether implemented as part of an operating system or a specific application, component, program, object, module or sequence of instructions may be referred to herein as computer programs or simply components. Search prioritization program 100 typically comprise one or more instructions that are resident at various times in various memory 114 and storage in a device and that, when read and executed by one or more CPUs 112 in the processing device 110, cause that computer 110 to perform the steps necessary to execute steps or elements embodying the various aspects of the methods and processes described herein.

It should be appreciated that computer 110 typically includes suitable analog and/or digital interfaces 128-138 between CPU 112, memory 114 and the attached devices as is known in the art. For instance, computer 110 typically receives a number of inputs and outputs for communicating information externally. For interface with a human database administrator or user, computer 110 typically includes one or more software developer input devices 162-164, e.g., a keyboard, a mouse, a trackball, a joystick, a touchpad, and/or a microphone, among others, and a display such as a CRT monitor, an LCD display panel, and/or a speaker, telephone, among others. It should be appreciated, however, that some implementations of computer 110, e.g., some server implementations, might not support direct software developer input and output. Terminal interface 134 may support the attachment of single or multiple terminals or laptop computers 144 and may be implemented as one or multiple electronic circuit cards or other units. Data storage 150 preferably comprises one or more rotating magnetic hard disk drive units, although other types of data storage, including a tape or optical driver, could be used. For additional storage, computer 110 may also include memory 114 comprising one or more mass storage devices 150, e.g., a floppy or other removable disk drive, a hard disk drive, a direct access storage device (DASD), an optical drive e.g., a compact disk (CD) drive, a digital video disk (DVD) drive, etc., and/or a tape drive, among others. A database 140 or a portion of which may accessed may be located on storage, including RAMs or mass storage devices of different computers 110 that are located through the Internet 180, a WAN 170, and other connected machines 128. In the context herein memory 114 may also be considered non-volatile or backup memories or a programmable or flash memories, read-only memories, etc., in a device physically located on a different computer, client, server, or other hardware memory device, such as a mass storage device or on another computer coupled to computer via network. Memory 114 may comprise remote archival memory such as one or more rotating magnetic hard disk drive units, a tape or optical driver having the source and/or target database 140. Memory 114 may also be considered one or more mass storage devices, such as a floppy or other removable disk drive, a hard disk drive, a direct access storage device (DASD), an optical drive e.g., a compact disk (CD) drive, a digital video disk (DVD) drive, etc., and/or a tape drive, among others, each of which may store the search prioritization technique and/or database 140. One of skill in the art will further anticipate that one or more interfaces 128-138 may be wireless.

Furthermore, computer 110 includes an interface 136, 138 with one or more networks 170, 180 to permit the communication of information with other processing devices and databases 140 coupled to the network(s) 170, 180. Network interface(s) 136, 138 provides a physical and/or wireless connection for transmission of data to and from a network(s) 170, 180. Network(s) 170, 180 may be the Internet, as well as any smaller self-contained network such as an Intranet, a wide area network (WAN), a local area network (LAN), or other internal or external network using, e.g., telephone transmissions lines, satellites, fiber optics, T1 lines, wireless, public cable, etc. and any various available technologies. One of ordinary skill in the art understands that computer system 10 may be connected to more than one network 170, 180 simultaneously. Computer system and remote systems 128 may be desktop or personal computers, workstations, a minicomputer, a midrange computer, a mainframe computer. Any number of computers and other microprocessor devices, such as personal handheld computers, personal digital assistants, wireless telephones, etc., which may not necessarily have full information handling capacity as the large mainframe servers, may also be networked through network(s) 170, 180. Still yet, any of the components of the methods and program products shown in the embodiments of FIG. 1 through FIG. 6 could be deployed, managed, serviced by a service provider who prioritizes searches to a databases based on search template attributes.

Figure 2:
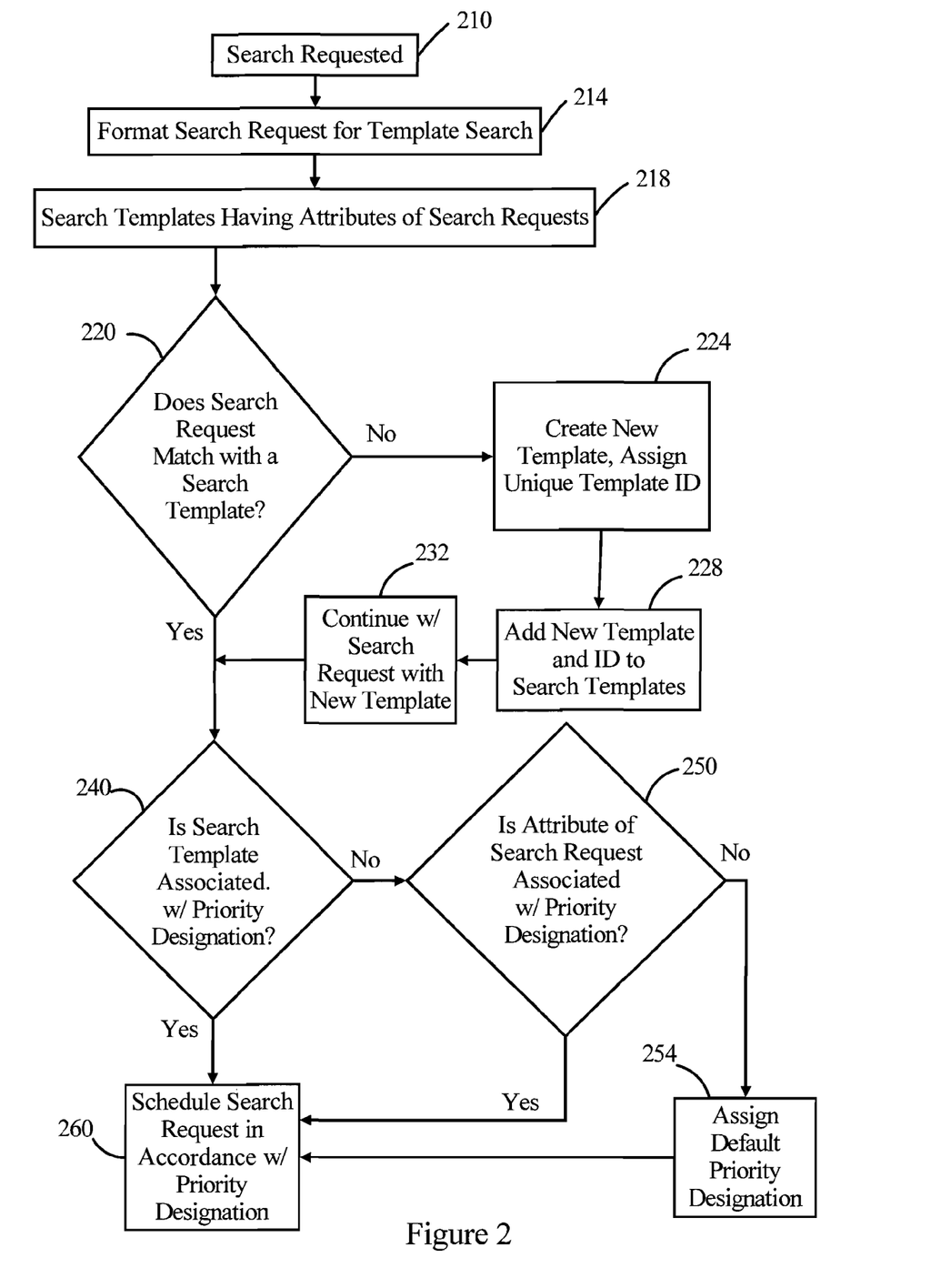
FIG. 2 is a simplified flow chart of the process by which search requests are interrogated to determine the priority of a specific search request. It is suggested that FIG. 2 be printed on the face of the patent.

Shown in FIG. 2 is a flow chart of the process steps of the search prioritization 200 shown. In step 210, a search is received into computer 110 to search a database 140. The search is generated in and sent from a client computer connected on a network to a server computer having the search prioritization program 100 and the database 140 or to another client computer whose sole purpose is to receive and process search requests to the database. The computer upon which the database is stored need not be the same computer upon which a directory to the database is stored. Neither of these computers needs be the same computer as the one upon which the search prioritization executes, which may still be a different computer than one which has programs that manage and access the database. The attributes of a search pertain to attributes of the client and user requesting the search; depending upon the particular client, the search may have different search attributes in different order. There are many prevalent applications and interfaces such as browsers and customer-written applications using, e.g., JAVA, that also generate search requests to directory servers. Described herein is a search format but the principles of the embodiments described herein are not intended to be limited to this format or to the implementations. An example of a search format could be a Lightweight Directory Access Protocol (LDAP) or an X.500. The ldapsearch is simply one well known client application to provide input parameters (attributes) and generate a search request to an LDAP capable directory server but the search does not define the request per se. The actual parameters of a search request are described in the LDAP protocol. The syntax of an ldapsearch, moreover, is not precisely defined or limited by protocol; since its original implementation many years ago, the syntax has been extended, altered, and augmented with additional options and differences among implementations presenting one or more attributes such as the host or Internet Protocol (IP) address -h; a requestor's login ID -D; a password -w; the scope of the search, that portion of the directory to which the search is confined -s; the attributes to be returned -b; and other attributes. An example of LDAP search is given below where the attributes are underlined and bolded, followed by the value of the particular attribute.

ldapsearch -h 1.2.3.4. -D cn=admin -w password -s sub -b o=IBM "object class=person" junk1 junk2

Empirically it has been observed that many search requests targeted at a given database server are identical or else vary only slightly by one or more specific attributes from other searches such that the vast majority of search requests can be categorized into a relatively small number of search templates. Creation of search templates based on this recognition has been described in U.S. Patent Application Publication 2008/0208804, Ser. No. 11/680,193 entitled USE OF SEARCH TEMPLATES TO IDENTIFY SLOW INFORMATION SERVER SEARCH PATTERNS to Lin filed on 28 Feb. 2007, which application has a common assignee and is hereby incorporated by reference in its entirety. A search template is characterized by its specific attributes wherein the values of some of these attributes or the inclusion of other attributes don't matter or can have a wildcard value indicating that the values of the attributes do not characterize the search template. For instance, a LDAP search template may be: Ldap://<client IP address> <base distinguished name DN>?<return attributes>?<scope>?<search filter>?<search success or failure>,<number of search executions>,<average search time>,<search rate of previous 1 minute>,<max rate achieved>,<time max rate occurred>, <time search template first created>,<ID of template>. For purposes of the search prioritization program 100 described herein the attributes that determine a particular template may be, e.g., <client IP address> <base distinguished name DN>?<return attributes>?<scope>?<search filter>? wherein each separate template has unique values of these five attributes and is identified by <ID of template>. The base distinguished name DN is typically the base in the directory from which to begin the search request, for example, if the base distinguished name DN is <role=employees>, then the search request will start at the database directory "employees". <Return attributes> are those directory attributes to be included with any entries that are returned as a result of the search. <Search filters> are a specification of a set of conditions on the data's attributes and associated values of those attributes that must be true in order for that data to be returned on the search. The <scope> of the search in combination with the base distinguished name informs the database server of which entries within the directory hierarchy qualify for the search, subject to matching the specified filter. One of skill in the art will understand that the selection of particular objects to be used as attributes, filters, scope, IP addresses, etc. to define specific templates will be determined by the data within the database and use of the database.

Returning to FIG. 2, in step 210, the search prioritization program 100 becomes aware that a search request is received into the database server. In step 214, if the search request is not already formatted, it is formatted for subsequent steps. For instance, the attributes of the search request may be put into a string format or other common format or even a preliminary search template for easy processing. In step 218, the search prioritization program 100 searches a file having existing search templates and compares the values of selected attributes with the values of the same attributes of existing search templates. Search prioritization may consider any number of attributes in the comparison step; one of skill in the art will appreciate that different attributes may be used for different priorities. For example, search requests originating from a particular IP address or having a specific start point in the directory may identify a particular search template. Or search requests requesting certain objects in the database may be correlated to another search template. By way of example, in the embodiment described herein five attributes are selected when comparing with existing search templates. The number and kinds of attributes included in the search template are subjective; these attributes best represent the majority of search requests in this particular embodiment.

If the values of the selected attributes of a search request match the values of an existing template in step 220, then search prioritization program 100 will inquire whether the search request has an associated priority in step 240. If so, then in step 260, the search request will be scheduled for execution according the priority designation.

Returning to step 220, if the values of selected attributes of the search request do not match any existing search template in the search prioritization program 100, then in step 224, the search prioritization program 100 creates a new search template having the values of the selected attributes and may assign "don't care" or wildcard to either the values or the attributes. Search prioritization program 100 will assign the newly created search template with a unique template identification number in step 224. The new search template and its template identification number are stored in a computer memory at step 228. In step 232, the search request which caused the new search template to be created will be associated with the new search template and the unique template identification number, and the process continues to step 240.

In step 240, if the search template is not associated with a priority designation, then in step 250, the database server determines if a value of any one of the other attributes of the incoming search request is associated with a priority designation that was configured before the database server was initiated. For instance, in step 240, the inquiry is whether the unique search template id is associated with a priority designation, while in step 250, the inquiry is whether a particular search request can be associated with a priority designation using other attributes and specific values of those attributes, such as an IP address of the source of the request and/or a requestor's logon ID. If so, then the search request is scheduled for execution according to the priority designation in step 260. If the values of other attributes of the search request cannot be associated with a priority designation in step 250, then a default priority designation may be assigned, as in step 254 and then the search request is scheduled for execution according to the default priority designation.

FIG. 2 is a simplification of numerous processes of different applications executing on the same or different machines in a distributed computer system wherein the different applications exchange data across one or more networks. In one embodiment, the processes are executing on the same machine upon which the actual database is stored. For example, the search prioritization program 100 interacts and becomes part of an application called a database server that manages access to the database by, inter alia, organizing the data in the database and acting as a gatekeeper to the database. In the implementation described herein the database server is the TIVOLI DIRECTORY SERVER which is IBM Z/SERIES implementation of an LDAP. Moreover, there may be several such database servers installed on a single machine. The database server also interacts with the workload manager associated with the operating system of the particular computer.

Figure 3:
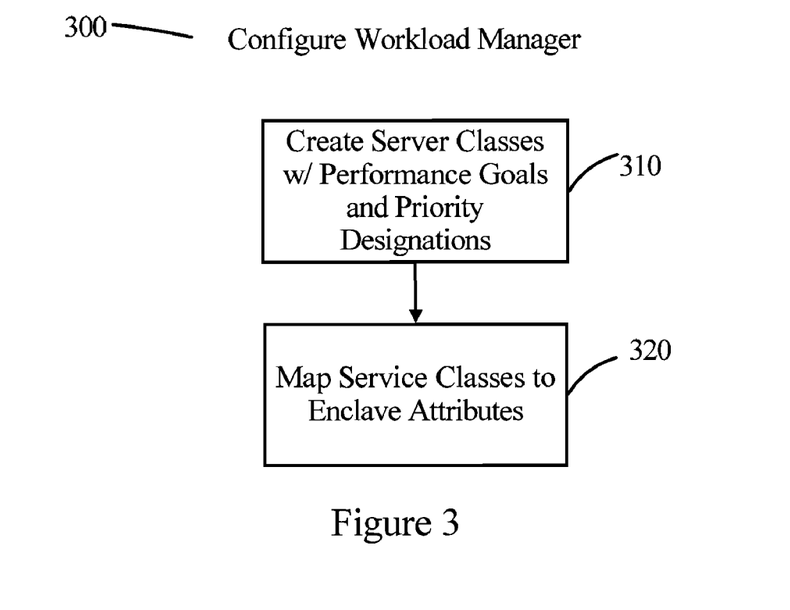
FIG. 3 is a simplified flow chart of the steps to configure a workload manager for interaction with the search prioritization method.

Before using the search prioritization program 100, several configurations must occur. FIG. 3 provides steps of configuring the workload manager 300 wherein a user establishes the goals and service classes of the workload manager by interacting with graphical user interfaces provided by the workload manager. In step 310, an administrator creates service classes having particular performance goals and priority designations and further establishes defaults. By way of example only, four service classes of a workload manager might be CRITREQ which may be assigned the default; HIGHREQ, NORMREQ, and SPAMREQ. The names, numbers and types of the service classes are provided as examples only, they could easily be called One, Two, Three, Four, and More service classes that are set up when the workload manager is first configured.

In step 320, the administrator maps the service classes to enclave attributes. An enclave represents a unit of work. In this configuration step, the administrator establishes classification rules in the workload manager to match enclave attributes to a service class. In one embodiment, a workload manager matches an enclave to a service class based on three attributes of the enclave—transaction name, an instance of a database server, and a processor complex. As an example, there may be more than one database server processing search requests scheduled by the workload manager 190; so requests from a particular database server would be have a unique attribute and might be designated to a unique enclave of the workload manager. Then search requests pertaining to that instance of a database server will execute with the priority designation of the service class associated with that enclave. The other refers to a processor complex (sysplex) wherein one or more processors are joined into a single unit, either logically or physically. Using the instance of database server and the processor complex, an administrator can set up the workload manager to distinguish between different database servers running on the processor complex to establish different service classes for each instance of the database server. In most instances, the instance of a database server and the processor complex don't change so the transaction name is the attribute that identifies the enclave. For example, an administrator of the workload manager 190 configures an enclave having a value of the transaction name called EXCEPT1. This informs the workload manager that when a search request has a transaction name of EXCEPT1, that search request will be executed under the performance goals of the service class that the administrator specified when configuring the workload manager 190, for instance, the administrator may have configured the enclave identified by the transaction name EXCEPT1 to be in the service class SPAMREQ. A service class may have more than one enclave but an enclave is within only one service class.

Figure 4:
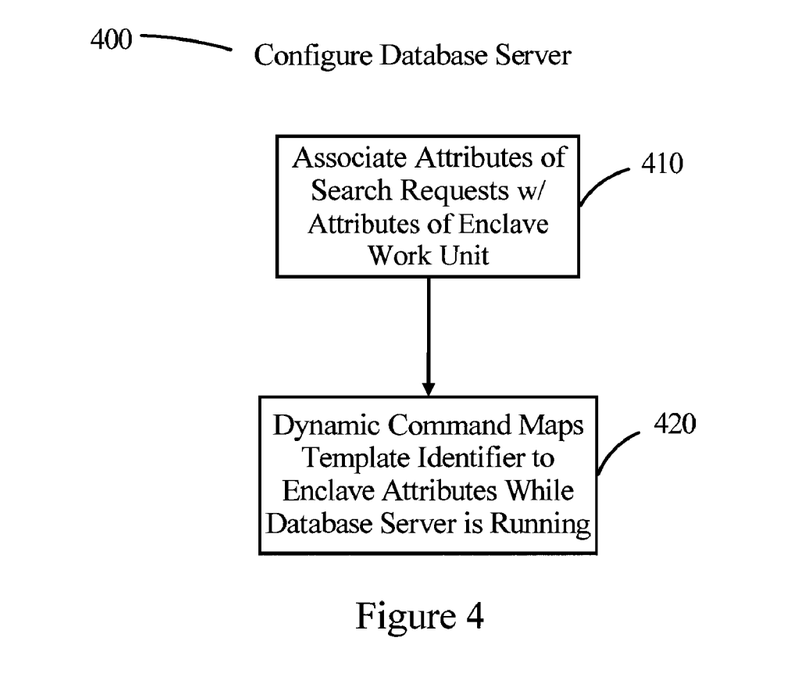
FIG. 4 is a simplified flow chart of the required steps to configure a database server for interaction with the search prioritization.

FIG. 4 illustrates steps required to configure the database server 400 so that the database server is able to map attributes of a search template to the attributes of enclaves. Configuration of the database server is required at 400 for many reasons, among which one is that specifying attributes of the enclave, such as a transaction name, in the workload manager does not create the respective association in the database server, so step 410 creates the respective association in the database server with the workload manager's enclaves. Configuration of the database server in step 410 also sets up default values such that, for instance, if a search request is not matched to an enclave then the search request may join the GENERAL enclave with workload manager transaction name GENERAL. In step 410, an administrator executes configuration commands so that the database server can associate an IP address and/or a requestor's login ID to a transaction name. This configured association endures for the duration of the server. An example of a configuration command is configure enclaveTransactionName [IP] [DN] which assigns the TransactionName to an IP address and a requestor's login ID. Now the database server can associate an IP address or a requestor's login ID with a transaction name of an enclave and the workload manager will associate the enclave with a service class. The transaction name is what associates this enclave with a service class in the workload manager. Configuration of the database server in step 410 enables the decision block 250 of FIG. 2 to determine if a search request is associated with an IP address or a requestor's login ID when a search request does not have an associated transaction name or a template identifier.

Step 420 represents execution of a dynamic command that occurs while the database server is running. This dynamic command associates a template identifier with a transaction name of an enclave. Preferably, the associations between a search template and an enclave set by the dynamic commands supersede the associations set up during static configuration in step 410, i.e., the dynamic command supersedes and/or undoes the configuration commands set up in step 410. Rules can be configured to handle different circumstances, for instance if dynamic commands have duplicate values of a transaction name, then there may be policy that the search requests mapped to a particular enclave depend on the order that the dynamic commands are entered with the most recent association or mapping taking precedence. A user can also choose to reset only those previous dynamic commands for a particular search template id using a dynamic command. If the steps of FIG. 4 are not done to map a search request to an enclave which in turn is mapped to a service class, the workload manager may use the default or a low priority designation for an enclave referenced in workload manager using the transaction name.

Figure 5:
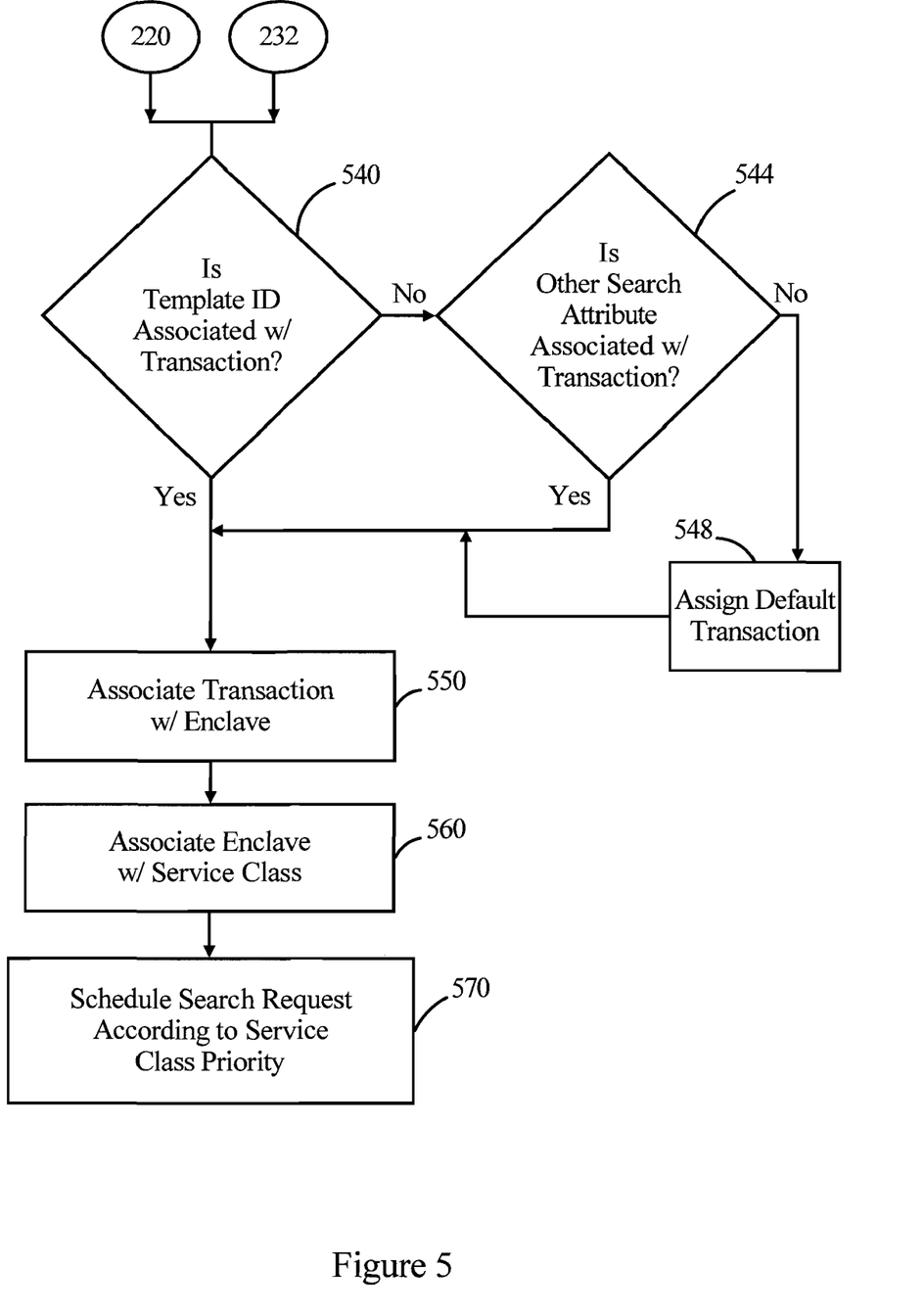
FIG. 5 is a flow chart of steps executed by the database server and the workload manager to implement one embodiment of the search prioritization.

FIG. 5 is a flow chart of process steps that assumes first that the workload manager and the database server have been configured as in FIGS. 3 and 4, respectively. The process steps of FIG. 5 occur between steps 220 and 232 and step 260 in a particular embodiment wherein the database is on a large mainframe computer executing an operating system (OS), its workload manager, a database server that manages search requests to the database, and the search prioritization program 100. After steps 220 and 232, the search prioritization program 100 interacts through and with the database server to determine if the unique search template id is associated with a particular transaction name at step 540. If not, then in step 544, the search prioritization will determine if a transaction name exists for other attributes and particular values of those attributes, mainly the IP address or the login distinguished name. If, in step 544, a transaction name does exist for the IP address or the login distinguished name, the transaction name is obtained from an enclave characterized by these other attributes—the IP address and/or the login distinguished name, in other words, in step 544, the database server selects the appropriate enclave for each search request by matching the attributes IP and DN with the IPs and DNs used during configuration of the database server until a match is found to associate the search request with an enclave and then to obtain the transaction name associated with that enclave. Otherwise, in step 548, a default transaction name is assigned to the search request. In the embodiment described herein and in step 550, the transaction name is the determining attribute corresponding to an enclave to select the enclave.

Recall that in FIG. 3, step 320, the workload manager associates enclave attributes with service classes. Now in step 560, after the enclave attribute is determined from the transaction name in step 550, the workload manager associates the enclave attribute with a service class. The workload manager, already knowing the priority designation and performance goals of a service class associated with a transaction name, assigns the priority and goals to that enclave in step 570 and schedules the execution of the search requests within the enclave associated with that priority designation.

Figure 6:
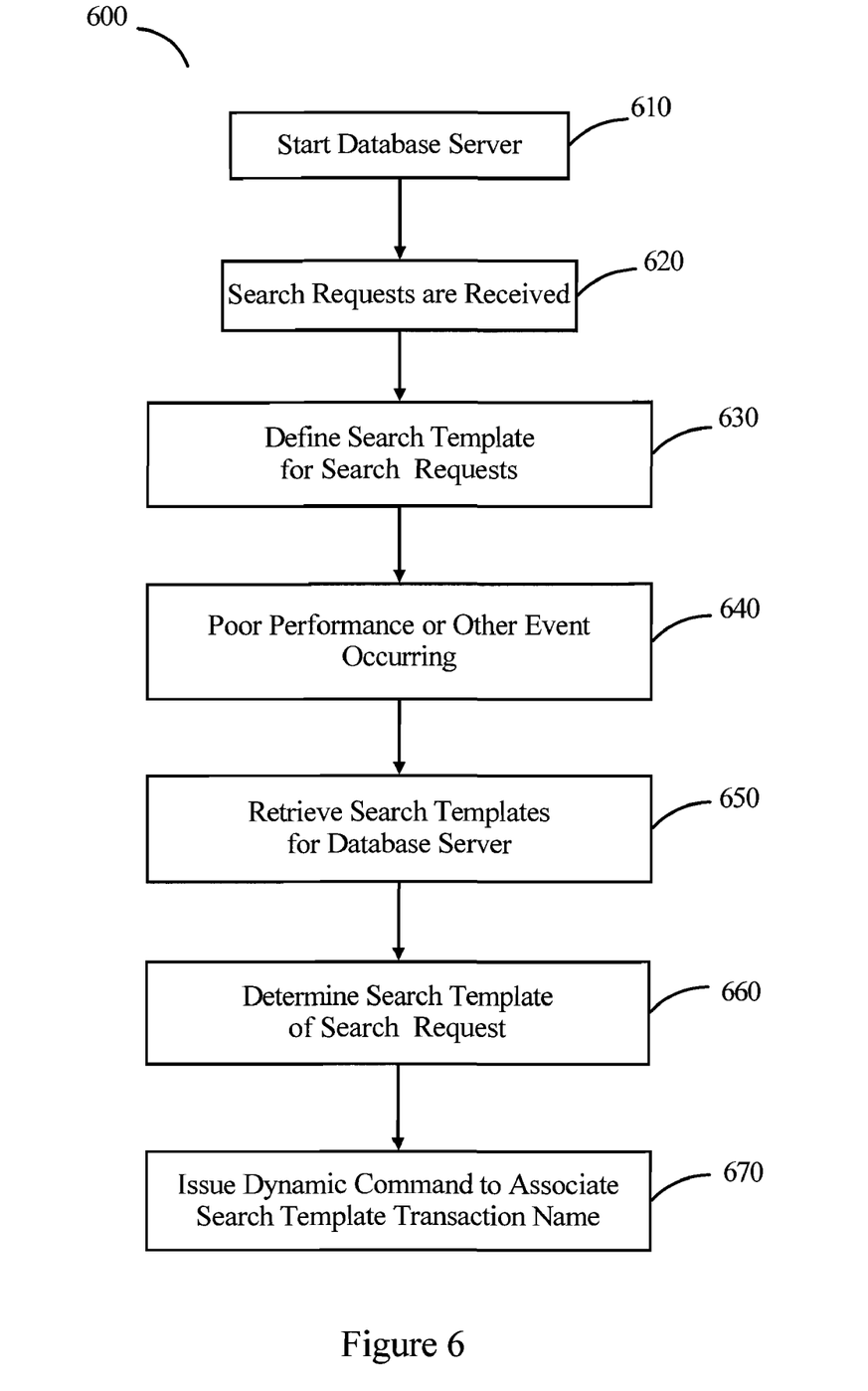
FIG. 6 is a flow chart of how an embodiment of the search prioritization is used in an executing database server.

FIG. 6 is a flow chart of the process by the search prioritization is initialized 600. In step 610, the database server is started and in step 620, search requests are received. In step 630, a search template is created for each unique search request based on the values of the search request attributes as explained earlier in FIG. 2. Once the database server is operating, more and more search requests are executed. In step 640, an administrator may observe or monitoring software may report an unusual event, e.g., poor performance of the database server or unusually high traffic from a particular IP address or certain events associated with a distinguished name, etc. Typically, some of the values of the search request attributes such as success, number of operations, number of failed operations are collated. In some instances, search requests from a particular user or IP address may dominate in the database server and delay or prevent other search requests from executing. In step 650, an administrator or monitoring software will retrieve the search templates for that database server and in step 660 isolate the search template associated with the event noted in step 640. Then in step 670, an administrator may issue a dynamic command to either associate or change the search template id with a transaction name and thus with a service class to change the performance goals and the priority designation of search requests having the search template id. Preferably, an executed dynamic command supersedes any associations that were configured before the database server was initiated.

As implemented the search prioritization program 100 allows spam to be more easily identified and execute possible spamming search requests under a lower priority than the rest of the client requests. Search request that are not spamming are unaffected and performance goals will not be sacrificed. Search requests identified as spam may still be processed so that no search transactions are lost.

The following is an example of a dynamic command executed while the database server is running: associate EXCEPT1 1.2.3.4 cn=bob. Execution of this command will associate the transaction name value (EXCEPT1) with an enclave having IP address 1.2.3.4 and DN cn=bob. The workload manager associates an enclave having the transaction name EXCEPT1 with a service class SPAMREQ. So, by executing this dynamic command, the database server joins any search request with IP address 1.2.3.4 and DN cn=bob to the workload manager service class SPAMREQ.

Another example is presented. First an administrator defines a workload manager transaction name GENERAL during workload manager configuration of FIG. 3. Defaults may be set as follows: the service class CRITREQ is associated with a transaction name GENERAL, a service class NORMREQ is associated with a transaction name EXCEPT1; a service class HIGHREQ is associated with a transaction name EXCEPT2; and a service class LOWREQ is associated with a transaction mane EXCEPT3. Each transaction name is associated with an enclave. These transaction names are mapped to search requests in the database server during configuration of the database server. Any search request not mapped to an enclave can be set to a default transaction name, for example if a search request has a transaction name EXCEPT32, then the default service class CRITREQ is used because there is no other service class associated with this transaction name value in the example above. Alternatively, a dynamic command can be executed to associate a template identifier with a transaction name, and hence to an enclave and a service class.

Having thus described several embodiments in detail and by reference to the drawings, it will be apparent that modifications and variations are possible without departing from the scope of the invention defined in the appended claims.

What is claimed is:

1. A method to prioritize execution of search requests to a database stored on a computer, the method comprising:
    reading a value of at least one attribute of a search request;
    determining that the value of the at least one attribute matches a value of at least one attribute in a search template;
    creating a new search template when the value of the at least one attribute does not match the value of at least one attribute in a search template;
    selecting the search template having values and attributes that closest match values and attributes of the search request;
    determining that the selected search template is associated with a service class having an execution priority;
    scheduling execution of the search request according to the execution priority of the associated service class;
    assigning a database transaction name to a one or both of an IP address of a source of the search request and a requestor's login ID;
    creating a work unit of at least one task to be executed in the computer;
    assigning at least three characteristics to the work unit comprising a work unit transaction name, an instance of a database server, and a processor complex; and
    associating a service class to the work unit.

2. The method to prioritize execution of search requests to a database stored on a computer as in claim 1, further comprising:
    assigning an identifier to the search template; and
    associating the search template identifier with the database transaction name.

3. The method to prioritize execution of search requests to a database stored on a computer as in claim 1, further comprising:
    associating the database transaction name with the work unit transaction name.

4. The method to prioritize execution of search requests to a database stored on a computer as in claim 1, further comprising: one or both of the at least one attribute and its value of the search request is a wildcard.

5. The method to prioritize execution of search requests to a database stored on a computer as in claim 1, further comprising: one or both of the at least one attribute and its value of the search template is a wildcard.

6. The method to prioritize execution of search requests to a database stored on a computer as in claim 1, further comprising: the at least one attribute of the search request is a requestor's logon ID.

7. The method to prioritize execution of search requests to a database stored on a computer as in claim 1, further comprising: the at least one attribute of the search request is an IP address of a source of the search request.

8. The method to prioritize execution of search requests to a database stored on a computer as in claim 1, further comprising: the at least one attribute of the search request is a portion of the database to which the search request is confined.

9. The method to prioritize execution of search requests to a database stored on a computer as in claim 1, further comprising: the at least one attribute of the search request is a scope of the search request.

10. The method to prioritize execution of search requests to a database stored on a computer as in claim 1, further comprising: the at least one attribute of the search request is one or more return attributes to be returned to the source when the search request has been executed.

11. The method to prioritize execution of search requests to a database stored on a computer as in claim 1, further comprising: the at least one attribute of the search request is one or more search filters of the search request.

12. The method to prioritize execution of search request to a database stored on a computer as in claim 1, further comprising: assigning a database transaction name to a one or both of an IP address of a source of the search request and a requestor's login ID.

13. A computer system that prioritizes search requests to a database stored on the computer system, comprising:
    at least one processor having an operating system, the operating system having a workload manager, the at least one processor identified by a processor complex id;
    at least one database accessed by the operating system;
    an instance of a database server managing access to the database by the operating system and its workload manager; the instance of the database server further comprising:
        a plurality of search templates stored in a memory, each of the plurality of search templates identified by a template id and characterized by values of one or more template attributes;
        a search formatter that receives requests to access the database and formats one or more request attributes of each request, if necessary;
        a search comparator that compares values of the one or more request attributes with the values of the one more template attributes;
        a template selector that selects the search template whose template attributes and values have the closest match to the request attributes and values; and
        an enclave selector that selects an enclave of the workload manager associated with the template id of the selected search template or with one or more request attributes and their values; and
        a scheduler in the workload manager that schedules the request to access the database according to a service class associated with the selected enclave.

14. The computer system of claim 13 wherein the enclave selector further comprises:
    a transaction name matcher that matches a database transaction name derived from the template id or from the one or more request attributes and their values and matches them with a enclave transaction name of the selected enclave.

15. The computer system of claim 14 wherein the one or more request attributes from which the database transaction name is derived comprises one or both of:
    an IP address of a client issuing a request to access the database; and
    a requestor's logon id of a user requesting to access the database.

16. The computer system of claim 13, wherein the instance of the database server is connected to the at least one database on an Intranet or an Internet network.

17. The computer system of claim 13, wherein the operating system accessing the database is connected to the database on an Intranet or an Internet network.

18. A computer program product comprising a computer readable storage medium having computer usable program code embodied thereon comprising:
    computer program instructions on a tangible computer readable storage medium configured to prioritize search requests to a database in a computer system, the computer program instructions further comprising:
        first program instructions that assign a database transaction name to a one or both of an IP address of a source of the search request and a requestor's login ID;
        second program instructions that read a value of one or more attributes of a search request;
        third program instructions that determine that the value of the one or more attributes of the search request match a value of at least one attribute in a search template;
        fourth program instructions that create a new search template when the value of the one or more attributes does not match the value of at least one attribute in a search template;
        fifth program instructions that assign an identifier to the search template and associate the search template identifier with the database transaction name;
        sixth program instructions that select the search template having values and attributes that closest match values and attributes of the search request;
        sixth program instructions that associate the database transaction name with an execution priority,
    wherein the program instructions are stored on the computer readable media.

19. The computer program product of claim 17, wherein the first program instructions read values of one or more of the following attributes of the search request: a wildcard; a requestor's logon ID; an IP address of a source of the search request; a portion of the database to which the search request is confined; a scope of the search request; one or more return attributes to be returned to the source when the search request has been executed; one or more search filters of the search request.

* * * * *